(12) United States Patent
Kurle et al.

(10) Patent No.: US 9,879,686 B2
(45) Date of Patent: Jan. 30, 2018

(54) MAGNET DECOUPLING DEVICE FOR ELECTRIC ASSIST TURBOCHARGER

(71) Applicant: BorgWarner Inc., Auburn Hills, MI (US)

(72) Inventors: Charles J. Kurle, Fletcher, NC (US); Allan D. Kelly, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/643,485

(22) Filed: Mar. 10, 2015

(65) Prior Publication Data

US 2016/0268869 A1 Sep. 15, 2016

(51) Int. Cl.
| | |
|---|---|
| F04D 25/06 | (2006.01) |
| H02K 5/24 | (2006.01) |
| F02B 37/04 | (2006.01) |
| F04D 29/26 | (2006.01) |

(52) U.S. Cl.
CPC ............ *F04D 25/064* (2013.01); *F02B 37/04* (2013.01); *F04D 25/06* (2013.01); *F04D 29/263* (2013.01); *H02K 5/24* (2013.01); *F05D 2220/40* (2013.01); *Y02T 10/144* (2013.01); *Y10T 464/50* (2015.01)

(58) Field of Classification Search
CPC ...... F04D 25/064; F04D 25/062; F04D 25/06; F04D 29/18; F04D 29/20; F04D 29/263; F01D 25/04; H02K 5/24; H02K 21/028; H02K 147/09; H02K 7/04; H02K 15/165; F02C 6/12

USPC .......... 464/180; 310/156.16, 156.17, 156.24, 310/156.28

See application file for complete search history.

(56) References Cited

U.S. PATENT DOCUMENTS

| | | | | |
|---|---|---|---|---|
| 5,801,470 | A | * | 9/1998 | Johnson ............... H02K 1/2733 310/156.27 |
| 5,895,033 | A | * | 4/1999 | Ross ....................... F16F 7/116 267/161 |
| 6,191,510 | B1 | * | 2/2001 | Landin et al. .................. 310/51 |
| 7,795,771 | B2 | * | 9/2010 | Lott ..................... H02K 1/2733 310/156.22 |
| 2009/0010760 | A1 | * | 1/2009 | Hayasaka et al. ............ 416/144 |
| 2009/0139079 | A1 | * | 6/2009 | Shibui ...................... H02K 7/04 29/598 |
| 2010/0175377 | A1 | * | 7/2010 | Hippen et al. .................. 60/602 |

OTHER PUBLICATIONS

Random House Webster's unabridged dictionary, pp. 1846-1847, Second Edition, Copyright 2001, Random House Reference, New York, NY.

* cited by examiner

*Primary Examiner* — Devon Kramer
*Assistant Examiner* — Kenneth J Hansen
(74) *Attorney, Agent, or Firm* — BrooksGroup

(57) ABSTRACT

A number of variations may include a product for use with a turbocharger system may include an electric motor with a rotor rotating about an axis. The rotor may operate through a bending critical mode. A magnet may be disposed in the rotor. The rotor may be provided with a selected amount of compliance to tune the bending critical mode to occur at a selected rotational speed.

30 Claims, 2 Drawing Sheets

MAGNET DECOUPLING DEVICE FOR ELECTRIC ASSIST TURBOCHARGER

TECHNICAL FIELD

The field to which the disclosure generally relates includes turbocharger systems for use with internal combustion engines and in particular, includes electric assist turbocharger design and construction.

BACKGROUND

A turbocharger for use with an internal combustion engine may typically include a compressor that may be driven by a turbine or other rotation imparting device. The turbine may have a wheel connected to a compressor wheel by a common shaft that is supported for rotation by bearings. The bearings may be disposed in a housing that may be situated between the turbine and the compressor. To provide additional operational options, electric assisted turbochargers may include an electric motor that may be operated to supplement the rotational input provided by the turbine.

A turbocharger's rotor assembly may rotate at speeds that approach hundreds of thousands of revolutions per minute. In addition, the turbine may be exposed to high temperature exhaust gases and the resulting heat may be transferred to other system components. Under these harsh, and increasingly demanding operating conditions, the lifespan of a turbocharger is expected to match that of the engine with which it operates. To accomplish that challenge, the design of a turbocharger and its components must perform as expected, while still being cost effective and competitive.

SUMMARY OF ILLUSTRATIVE VARIATIONS

A number of variations may provide the ability to tune the modal properties of a rotor assembly for use in an electrified turbocharger system, to manage vibration. Where operation of the rotor is supercritical, at least one bending mode may occur within the operating speed range. Strategic positioning of the rotor bending modes relative to the system operating speed range can be advantageously accomplished by tuning, so that the first bending critical mode may be traversed during ramp up and spool down. The second bending mode may be tuned to occur at speeds above the operating range.

According to a number of variations, a product for use with a turbocharger system may include an electric motor with a rotor rotating about an axis. The rotor may operate through a bending critical mode. A magnet may be disposed in the rotor. The rotor may be provided with a selected amount of compliance to tune the bending critical mode to occur at a selected rotational speed.

A number of other variations may include a method of tuning the bending stiffness of a rotor. An inner sleeve may be provided in the rotor. At least one magnet may be positioned on the inner sleeve. A compliant element may be positioned adjacent the magnet and on the inner sleeve. The compliant element may be compressed to apply a force to the magnet.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
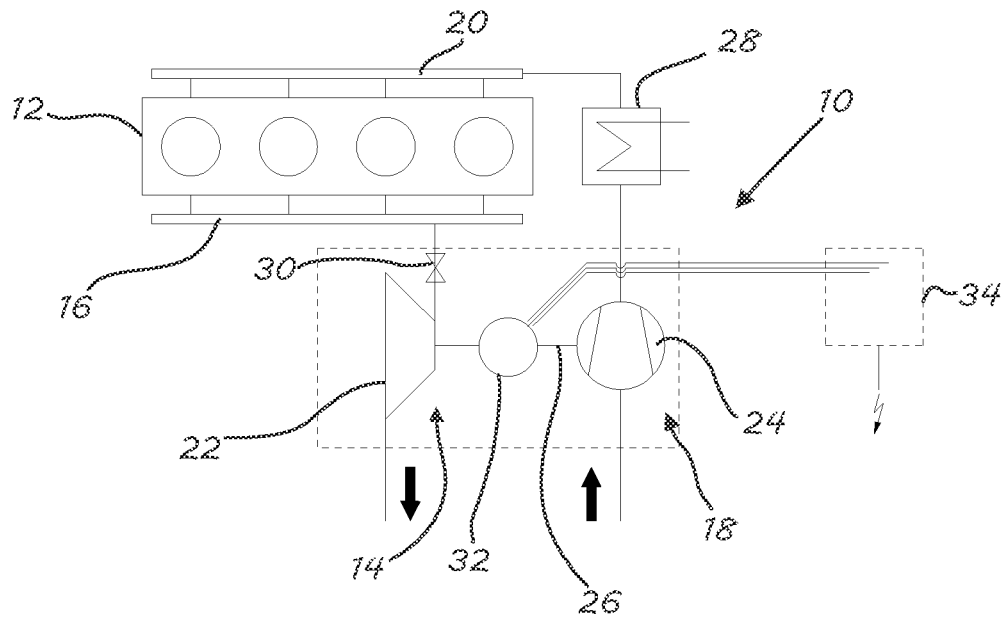
FIG. 1 is a schematic diagram of an electric assisted turbocharger system according to a number of variations.

In a number of variations as illustrated in FIG. 1, an electric assisted turbocharger system 10 may be associated with an internal combustion engine 12. A turbine 14 may be connected to an exhaust system 16 of the engine 12. A compressor 18 may be connected to an intake system 20 of the engine 12. The turbine 14 may include a turbine wheel 22 that may be connected to a compressor wheel 24 of the compressor 18 by a shaft 26, which together may form at least part of the turbocharger's rotating assembly. Exhaust gas from the engine 12 may be directed over the turbine wheel 22 to rotate the shaft 26 and the connected compressor wheel 24. Rotation of the compressor 24 may charge the intake system 20 of the engine 12. An intercooler 28 may be disposed in the intake line between the compressor 18 and the engine 12. A control mechanism 30, may be provided in the form of variable turbine geometry, which in turn may regulate the rotating speed of the compressor wheel 24.

The electric assisted turbocharger system 10 may include an electric motor 32 that may be configured to drive the shaft 26. The electric motor 32 may be operated to drive the shaft 26 and to supplement the power provided to the compressor 18 by the turbine 14. The electric motor 32 may be interconnected with an electronic control unit 34 for operation according to a selected strategy. The electric motor 32 may provide added or optional power to charge the intake system 20, such as during engine operating conditions with very low exhaust gas energy. These conditions may occur at low engine speed and low load. The electric motor 32 may include a magnetic rotor assembly (such as shown in FIG. 2), that may rotate with the shaft 26, and that may be driven by a stator of the electric motor 32.

The rotating shaft 26 and the magnetic rotor may rotate about an axis that may be defined as the axis that exists along the shaft 26 when it is at rest. During operation, the actual rotation of the shaft 26 and rotor may deflect during rotation and so may not be precisely about the axis. The lateral deflection or bending of the shaft and rotor may create resonant vibration at certain speeds, known as critical speeds. A mode that has a rotational speed of the shaft 26 and rotor that corresponds to the critical speed may occur at a frequency resulting in a peak in a vibration response of the system and may be termed a bending critical mode. For the shaft 26 and rotor, a number of rotational speeds may result in critical speed modes. The lowest rotational speed at which a bending critical mode is reached may be termed the first bending critical mode. To avoid entering a bending critical mode of operation, a conventional shaft may be designed with the highest possible first bending critical mode to operate at the highest expected rotational speed without experiencing the first bending critical mode. It may be said that such a system operates only at subcritical speeds.

Figure 2:
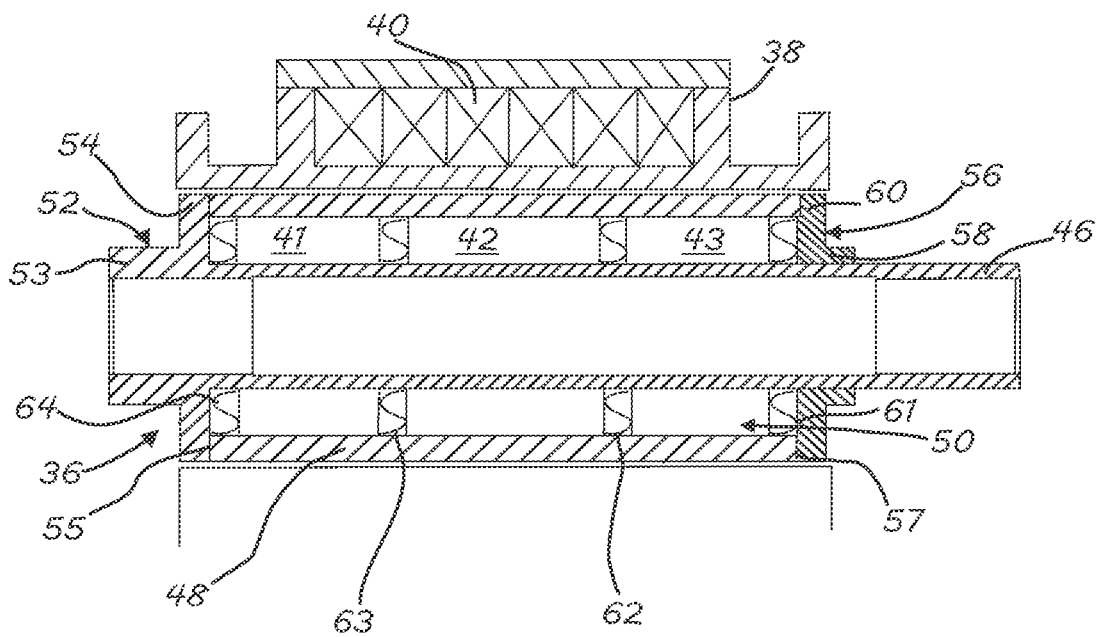
FIG. 2 is a schematic diagram of part of an electric motor for an electric assisted turbocharger system according to a number of variations.
Figure 3:
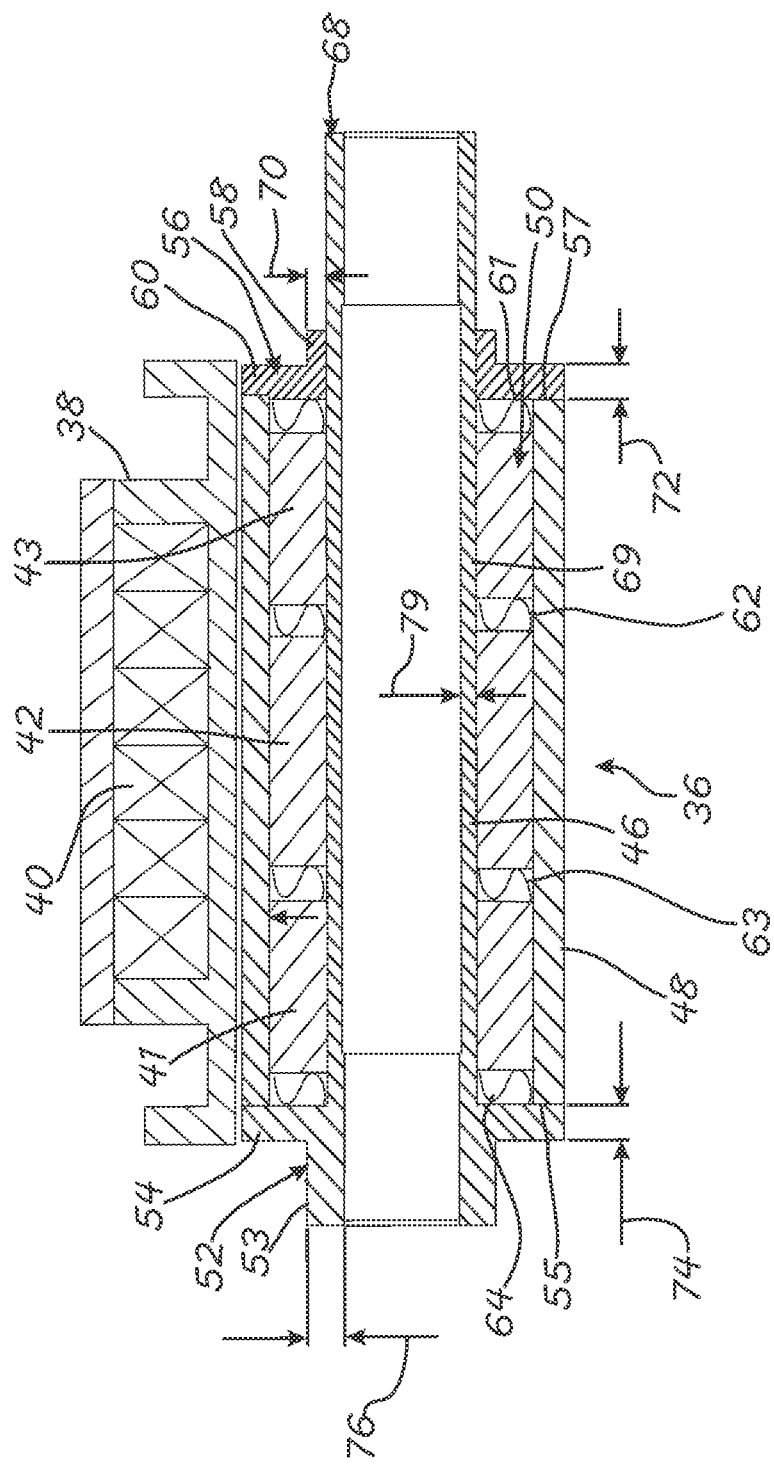
FIG. 3 is a schematic diagram of part of an electric motor for an electric assisted turbocharger system according to a number of variations.

A number of variations may be described in relation to the details of electric motors as illustrated in FIGS. 2 and 3, which may be used as the motor 32 of FIG. 1. These variations allow tuning critical speed modes to facilitate operating at supercritical rotational speeds, or speeds above the first bending critical mode. The electric motor variations may include a rotor assembly 36 and a stator assembly 38. The stator assembly 38 may operate as an electromagnet; which may be energized by field windings 40. Rotation may be imparted to the rotor assembly 36 as a result of an interaction between the field windings 40 and magnetic fields in the rotor which may produce a torque about the rotor assembly's axis. To provide the magnetic field, the rotor assembly 36 may include a number of magnets 41, 42 and 43.

The rotor assembly 36 may include an inner sleeve 46 that may be formed as a hollow cylinder. The inner sleeve 46 may be formed of a durable high strength non-magnetic material such as titanium, but could be another material such as a steel alloy including high nickel steel. The shaft 26 of FIG. 1 may be positioned through the inner sleeve 46 so that the two rotate together and define a shaft system in which the stiffness of the rotor contributes to dynamic characteristics of the system. The rotor assembly 36 may include an outer sleeve 48 that may be formed as a hollow cylinder. The outer sleeve 48 may be formed of a durable material such as a fiber reinforced composite material which may be a fiber reinforced polymer. Fibers in the outer sleeve 48 may be oriented to influence its stiffness. The outer sleeve 48 may have a diameter that fits within the stator assembly 38 along the field windings 40. The outer sleeve 48 may be positioned over and around the inner sleeve 46 in a spaced apart relationship to define an annular cavity 50 that contains the magnets 41, 42 and 43. The magnets 41, 42 and 43 may be stacked in the cavity 50. Each magnet 41, 42, 43 may be formed in the shape of a hollow cylindrical section with an outer diameter sized for a compression fit within the outer sleeve 48 and an inner diameter sized to fit over the inner sleeve 46. The outer sleeve may function to compress the magnets to limit stress at high speed operation. The number of magnets can vary and may be selected to achieve a desired bending compliance. For example, the number of magnets may be increased to increase bending compliance.

One end of the cavity 50 may be closed by a rotor end cap 52 that may be formed as one piece with the inner sleeve 46. The end cap 52 may include an axially extending section 53 with a diameter that may be larger than the diameter of the rest of the inner sleeve 46 and may include an annular disk shaped radially extending section 54 with an outer periphery area that resides against an end 55 of the outer sleeve 48 and that forms a wall. Another end of the cavity 50 may be closed by another rotor end cap 56. The end cap 56 may include an axially extending section 58 that fits over the inner sleeve 46 and a radially extending section 60 that has an outer periphery area that resides against another end 57 of the outer sleeve 48 and forms a wall. The magnets 41, 42 and 43 may be fixed in the cavity 50 by the end caps 52, 56. The magnets and their position in the rotor assembly 36 may influence the stiffness of the rotating system and therefore contribute to the rotational speed at which a bending critical mode occurs. To maximize this rotational speed, the magnets 41, 42, 43 may be compressed between the end caps 52, 56 to increase stiffness. The length of the outer sleeve 48 from end 55 to end 57 may be such that the desired amount of compression can be applied, or the outer sleeve 48 may be slightly compressible to allow for a bandwidth of variation, and for bending to occur without overly stressing the material. Compression may be applied by a tie bolt on the shaft 26 when extended through the inner sleeve 46.

According to a number of variations, a method to tune the first bending critical mode to varying rotational speeds may involve decoupling the magnets 41, 42, 43 to result in a more compliant rotor assembly 36 in the radial or bending direction. Compliant elements 61, 62, 63 and 64 may be positioned between one of more of the magnets 41, 42, 43 and end caps 52, 56. The compliant elements 61-64 may be of coil spring, Belleville, wave washer, or another type of spring washer or compliant element with the desired spring constant. The compliant elements may be made from any material with an elastic modulus that will reduce the spring constant of the assembly, and may include polymers and aluminum. In addition, the geometry may be varied to adjust the spring constant. Tuning of the bending critical modes may be accomplished by selection of the spring constant k of the compliant elements 61-64 and by the number and location of compliant elements employed. A compliant element 61 may be positioned between the end cap 56 and the magnet 43. A compliant element 62 may be positioned between the magnet 42 and the magnet 43. A compliant element 63 may be positioned between the magnet 41 and the magnet 42. A compliant element 64 may be positioned between the end cap 52 and the magnet 41. In addition, the thickness of the end caps 52 and 56, including the axially extending sections 53 and 58 may be varied to tune compliance.

A number of additional variations may be described with reference to FIG. 3, which further illustrates modal tuning through material thickness variation. The magnetic rotor assembly 36 may include a core 68 that may be comprised of the inner sleeve 46 and the pair of end caps 52 and 56. The inner sleeve may have a tubular central section 69 positioned within the magnets 41, 42, 43. The inner sleeve 46 and the ends caps 52, 56 may be formed as separate components or may be integrally formed as one piece. An axial opening may extend through the inner sleeve 46 and the ends caps 52, 56 and may receive a shaft, such as the shaft 26 of FIG. 1. The magnets 41, 42, 43 may be positioned in the annular cavity 50 that is formed by the core 68. The outer sleeve 48 may be positioned over and may compress the magnets 41, 42, 43 to assist in managing stress during operation.

The end caps 52 and 56 may include sections that effect increased compliance of the magnetic rotor assembly 36 by reductions in material thickness. Varying the rotor's compliance by varying the material dimensions provides the ability to tune the modal properties of the rotor assembly 36 to manage vibration. Where operation of the rotor assembly 36 is supercritical, at least one bending critical mode may be tuned to occur within the rotor's operating speed range. Strategic positioning of the rotor bending modes relative to the system operating speed range can be advantageously accomplished by tuning, so that the first bending critical mode may be traversed during ramp up and spool down of the system. The second bending critical mode may be tuned to occur at speeds above the operating range.

The end cap 52 may include the axial extending section 53 with a reduced radial thickness 76, which forms the radially extending section 54 with axial thickness 74. The thickness 76 may be further reduced to be similar or equal in thickness to the thickness 79 of the inner sleeve 46, which may be similar to the thickness 70 of the end cap 56. By minimizing material thickness, compliance of the magnetic rotor assembly 36 may be increased. Similarly, the end cap 56 may include the axial extending section 58 with a reduced radial thickness 70 forming the radial extending section 60 with axial thickness 72. The thicknesses 70 and 76 may be varied or tuned to provide a selected amount of compliance of the rotor 36.

A greater amount of compliance may be provided through additional compliant elements and lower spring constants of those compliant elements, and may be provided by component thickness reduction. By tuning compliance and the allowed amount of bending, the rotational speeds at which the first bending critical mode is reached may be varied or tuned. Through these methods tuning of the first bending critical mode may be accomplished and set at the desired rotational speed. In addition, the frequency of the lateral bending mode may be reduced.

The description of variants is only illustrative of components, elements, products and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product for use with a turbocharger system and may include an electric motor with a rotor rotating about an axis. The rotor may operate through a bending critical mode. A magnet may be disposed in the rotor. The rotor may be provided with a selected amount of compliance to tune the bending critical mode to occur at a selected rotational speed.

Variation 2 may include the product according to variation 1 and may include a compliant element compressed in the rotor. The compliant element may apply a force to the magnet in a direction of the axis to provide the selected amount of compliance.

Variation 3 may include the product according to variation 1 and may include a core in the rotor. The core may have a section with a section thickness tuned to provide the selected amount of compliance.

Variation 4 may include the product according to variation 2 and may include a wall positioned at an end of the rotor, wherein the compliant element is compressed between the magnet and the wall.

Variation 5 may include the product according to variation 2 wherein the magnet may be a first magnet. A second magnet may be disposed in the rotor adjacent the first magnet, wherein the compliant element may be compressed between the first and second magnets.

Variation 6 may include the product according to variation 1 wherein the turbocharger system may include a turbine wheel and a compressor wheel. The turbine wheel may be connected to the compressor wheel by a shaft, wherein the shaft may extend through the rotor.

Variation 7 may include the product according to variation 2 wherein the compliant element may have a spring constant that may be selected to reduce a bending stiffness property of the rotor.

Variation 8 may include the product according to variation 3 wherein the core may include a tubular central section extending through the magnet. The core may have a first end cap on one side of the magnet and a second end cap on an opposite side of the magnet from the first end cap. The section thickness may be formed on at least one of the first and second end caps.

Variation 9 may include the product according to variation 8 wherein the tubular central section may have a wall thickness and wherein the section thickness may be approximately equal to the wall thickness.

Variation 10 may include the product according to variation 8 wherein the magnet may be compressed in an outer sleeve and wherein the core may include at least one radially extending segment that engages the outer sleeve.

Variation 11 may include a method of tuning the bending stiffness of a rotor. An inner sleeve may be provided in the rotor. At least one magnet may be positioned on the inner sleeve. A compliant element may be positioned adjacent the magnet and on the inner sleeve. The compliant element may be compressed to apply a force to the magnet.

Variation 12 may include a method according to variation 11 wherein the rotor may have a lateral bending mode. The compliant element may be selected to have a spring constant that reduces frequency of the bending stiffness mode of the rotating assembly.

Variation 13 may include a method according to variation 11 or 12 wherein the bending stiffness mode corresponds to a first bending critical mode of the rotor.

Variation 14 may include a method according to any of variations 11 through 13 and may include positioning an outer sleeve around the magnet.

Variation 15 may include a method according to any of variations 11 through 14 and may include positioning an end cap on the inner sleeve to retain the magnet. The compliant element may be compressed between the magnet and the end cap.

Variation 16 may include a method according to any of variations 11 through 15 and may include a second magnet on the inner sleeve.

Variation 17 may include a method according to variation 16 and may include compressing the compliant element between the first magnet and the second magnet.

Variation 18 may include a method according to variation 13 wherein a first operational speed corresponds to the first bending critical mode. A turbocharger shaft may be positioned through the inner sleeve. The turbocharger shaft may be rotated at a second operational speed that is greater than the first operational speed.

Variation 19 may include a method according to variation 11 wherein the rotor may have a lateral bending mode. The amount to which the compliant element is compressed may be adjusted to vary the lateral bending mode.

Variation 20 may include a turbocharger assembly for use with an internal combustion engine. A compressor wheel may be configured to charge an intake system of the internal combustion engine. A turbine wheel may be driven by an exhaust stream from the internal combustion engine. A shaft may connect the turbine wheel to the compressor wheel. A magnetic rotor assembly may be connected to the shaft. A stator may be disposed around the magnetic rotor assembly to drive the shaft through rotation of the magnetic rotor assembly. The magnetic rotor assembly may be comprised of an inner sleeve disposed around the shaft. An outer sleeve may be disposed around the inner sleeve forming an annular chamber between the inner sleeve and the outer sleeve. At least one magnet may be stacked in the annular chamber. An end cap may close an end of the annular chamber. The magnetic rotor assembly may operate through a bending critical mode. An amount of compliance of the magnetic rotor assembly may be tuned to set the bending critical mode to occur at a preferred speed through at least one of: (a) a compliant element compressed in the rotor assembly, or (b) a selected thickness of a section of the end cap.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising:
an electric motor;
a rotor disposed in the electric motor, the rotor rotating about an axis and operating through a bending critical mode;
a plurality of magnets disposed in the rotor;
a stator disposed in the electrical motor, the stator being constructed and arranged to operate as an electromagnet and thereby rotate the rotor;
at least one first spring compressed between adjacent magnets of each of the plurality of magnets; and
wherein the rotor is provided with a compliance by the at least one first spring that tunes the bending critical mode to occur at a selected rotational speed.

2. The product according to claim 1 further comprising a core in the rotor, the core having a section with a section thickness tuned to provide a selected amount of compliance to the rotor.

3. The product according to claim 1 further comprising a wall positioned at an end of the rotor, wherein a second spring is compressed between the plurality of magnets and the wall.

4. The product according to claim 1 further comprising an inner sleeve and an outer sleeve through which the inner sleeve extends, wherein the plurality of magnets are positioned between the inner and outer sleeves, and wherein the at least one first spring is positioned inside the outer sleeve and between the inner and outer sleeves.

5. The product according to claim 1 wherein the turbocharger system includes a turbine wheel and a compressor wheel, the turbine wheel connected to the compressor wheel by a shaft, wherein the shaft extends through the rotor.

6. The product according to claim 1 wherein the at least one first spring is a coil spring and has a spring constant that is selected to reduce a bending stiffness property of the rotor.

7. The product according to claim 2 wherein the core includes a tubular central section extending through each of the plurality of magnets, the core having a first end cap on one side of the plurality of magnets and a second end cap on an opposite side of the plurality of magnets from the first end cap, the section thickness formed on at least one of the first and second end caps.

8. The product according to claim 7 wherein the tubular central section has a wall thickness and wherein the section thickness is approximately equal to the wall thickness.

9. The product according to claim 7 wherein the plurality of magnets is compressed in an outer sleeve and wherein the core includes at least one radially extending segment that engages the outer sleeve.

10. A method of tuning the bending stiffness of the rotor of the product according to claim 1 comprising: providing an inner sleeve in the rotor; positioning the plurality of magnets on the inner sleeve; positioning the at least one first spring adjacent the plurality of magnets and on the inner sleeve; and compressing the at least one first spring to apply a force to the plurality of magnets.

11. The method according to claim 10 wherein the rotor has a lateral bending mode and further comprising: selecting the at least one first spring to have a spring constant that reduces a frequency of the lateral bending mode of the rotor.

12. The method according to claim 11 wherein the lateral bending mode corresponds to a first bending critical mode of the rotor.

13. The method according to claim 10 further comprising positioning an outer sleeve around the plurality of magnets.

14. The method according to claim 10 further comprising: positioning an end cap on the inner sleeve to retain the plurality of magnets; and compressing the at least one first spring between the plurality of magnets and the end cap.

15. The method according to claim 12 wherein a first operational speed corresponds to the first bending critical mode and further comprising:
positioning a turbocharger shaft through the inner sleeve; and rotating the turbocharger shaft at a second operational speed that is greater than the first operational speed.

16. The method according to claim 10 wherein the rotor has a lateral bending mode and further comprising adjusting the amount to which the at least one first spring is compressed to vary the lateral bending mode.

17. A turbocharger assembly for use with an internal combustion engine comprising:
a compressor wheel configured to charge an intake system of the internal combustion engine;
a turbine wheel driven by an exhaust stream from the internal combustion engine;
a shaft connecting the turbine wheel to the compressor wheel;
a magnetic rotor assembly connected to the shaft;
a stator disposed around the magnetic rotor assembly to drive the shaft through rotation of the magnetic rotor assembly;
wherein the magnetic rotor assembly is comprised of an inner sleeve disposed around the shaft, an outer sleeve disposed around the inner sleeve forming an annular chamber between the inner sleeve and the outer sleeve, a plurality of magnets stacked in the annular chamber, and at least one compliant element positioned in or adjacent the annular chamber and against the plurality of magnets, the at least one compliant element having a selected spring constant so that the rotor has a greater amount of a bending compliance by inclusion of the at least one compliant element as compared to an absence of the at least one compliant element.

18. A product for use with a turbocharger comprising an electric motor, a rotor disposed in the electric motor, the rotor rotating about an axis and operating through a bending critical mode that occurs at a specific rotational speed; a plurality of magnets disposed in the rotor; wherein the rotor exhibits a compliance that determines the specific rotational speed and that is tuned to cause the bending critical mode to occur so that the specific rotational speed occurs during a ramp up of the turbocharger to an operational speed, and further comprising a first rotor end cap containing the plurality of magnets, a second rotor end cap containing the plurality of magnets, a first compliant element axially separating the first rotor end cap from the plurality of magnets and a second compliant element axially separating the second rotor end cap from the plurality of magnets.

19. A product for use with a turbocharger comprising an electric motor, a rotor disposed in the electric motor, the rotor rotating about an axis and operating through a bending critical mode that occurs at a specific rotational speed; a magnet disposed in the rotor; wherein the rotor exhibits a compliance that determines the specific rotational speed and that is tuned to cause the bending critical mode to occur so that the specific rotational speed occurs during a ramp up of the turbocharger to an operational speed, wherein the rotor comprises a shaft, an inner sleeve disposed around the shaft, an outer sleeve disposed around the inner sleeve having a first diameter and forming an annular chamber between the inner sleeve and the outer sleeve, the magnet stacked in the annular chamber, a first end of the annular chamber closed by a first rotor end cap formed with the inner sleeve and including a first axially extending section having a second diameter that is larger than the first diameter of the inner sleeve, and the first rotor end cap has an annular disk shaped first radially extending section that forms a first wall and has a first outer periphery area that resides against a first end of the outer sleeve, a second end of the annular chamber closed by a second rotor end cap that has a second axially extending section that is fit over the inner sleeve and a second radially extending section that forms a second wall and that has a second outer periphery area that resides against a second end of the outer sleeve, the magnet fixed in the annular chamber by the rotor end caps.

20. The product according to claim 19 wherein the specific rotational speed is tuned to increase the compliance by selecting a specific thickness of at least one of the first axially extending section, the second axially extending section, the first wall or the second wall.

21. The product according to claim 18 wherein the plurality of magnets comprises a first magnet and a second magnet axially separated from the first magnet by a third compliant element.

22. The product according to claim 21 wherein the compliant elements each comprise a spring.

23. The product according to claim 21 wherein the compliant elements each comprise one of a coil spring, a Belleville spring, or a wave washer.

24. The product according to claim 18 wherein the plurality of magnets include an outer peripheral surface and further comprising an outer sleeve disposed over the outer peripheral surface, the outer sleeve compressed between the first and second rotor end caps.

25. The product according to claim 18 wherein the plurality of magnets comprise a plurality of permanent magnets stacked in the rotor, each adjacent pair of permanent magnets axially separated by at least one of the first compliant element or the second compliant element.

26. The product according to claim 25 wherein the compliant element is a spring.

27. The product according to claim 1 wherein the at least one first spring is compressible and compresses when compressed against the plurality of magnets.

28. The product according to claim 1 wherein the at least one first spring is elastic and recovers in shape after being compressed.

29. The product according to claim 7 wherein at least one of the first end cap or the second end cap is a single continuous component with the core.

30. The product according to claim 7 wherein at least one of the first end cap or the second end cap is a separate component from the core.

* * * * *